United States Patent
Chang et al.

(10) Patent No.: US 10,872,346 B2
(45) Date of Patent: Dec. 22, 2020

(54) COMMUNICATING METHOD AND COMMUNICATING SYSTEM

(71) Applicant: PRIMAX ELECTRONICS LTD., Taipei (TW)

(72) Inventors: Pei-Ming Chang, Taipei (TW); Shih-Chieh Hsu, Taipei (TW); Shi-Jie Zhang, Taipei (TW); Wei-Lung Huang, Taipei (TW)

(73) Assignee: PRIM AX ELECTRONICS LTD., Taipei (TW)

( * ) Notice: Subject to any disclaimer, the term of this patent is extended or adjusted under 35 U.S.C. 154(b) by 983 days.

(21) Appl. No.: 15/433,127

(22) Filed: Feb. 15, 2017

(65) Prior Publication Data
US 2017/0372325 A1 Dec. 28, 2017

(30) Foreign Application Priority Data
Jun. 24, 2016 (TW) .............................. 105119944 A

(51) Int. Cl.
G06Q 30/00 (2012.01)
G01M 99/00 (2011.01)

(52) U.S. Cl.
CPC ........ *G06Q 30/018* (2013.01); *G01M 99/008* (2013.01)

(58) Field of Classification Search
CPC ............... G06Q 30/018; G01M 99/008; G01R 31/31907; G01R 31/28; H04L 43/50; G06F 13/4226
See application file for complete search history.

(56) References Cited

U.S. PATENT DOCUMENTS

| | | | | |
|---|---|---|---|---|
| 5,778,198 A | * | 7/1998 | Kadota | G06F 13/4226 709/232 |
| 8,437,385 B1 | * | 5/2013 | Dark | H04B 17/21 375/224 |
| 9,955,371 B1 | * | 4/2018 | Koebele | H04W 56/0025 |
| 2002/0069388 A1 | * | 6/2002 | Niu | H04L 1/0071 714/748 |
| 2003/0206021 A1 | * | 11/2003 | Laletin | G01R 31/386 324/426 |
| 2009/0089004 A1 | * | 4/2009 | Vook | G06F 11/263 702/123 |
| 2009/0144035 A1 | * | 6/2009 | Mirgorodski | G06F 30/367 703/4 |
| 2011/0208465 A1 | * | 8/2011 | Tamura | G01R 31/31919 702/108 |
| 2014/0286382 A1 | * | 9/2014 | Dark | H04B 17/11 375/227 |

* cited by examiner

*Primary Examiner* — Stephanie E Bloss
(74) *Attorney, Agent, or Firm* — Kirton McConkie; Evan R. Witt

(57) ABSTRACT

A method for communicating with an under-test object and a communicating system are provided. The method includes the following steps. A command signal is provided from a processing unit of the communicating system to the under-test object, and the processing unit waits for receiving a response signal from the under-test object. If the response signal from the under-test object 5 has not been received by the processing unit for a predetermined waiting time period, the command signal is provided to the under-test object again and the predetermined waiting time period is adjusted. There is an exponential relation between the predetermined waiting time period and the number of times the command signal is provided to the under-test object.

4 Claims, 2 Drawing Sheets

COMMUNICATING METHOD AND COMMUNICATING SYSTEM

FIELD OF THE INVENTION

The present invention relates to a communication technology, and more particularly to a method for communicating with an under-test object and a communicating system using the method.

BACKGROUND OF THE INVENTION

Nowadays, the testing engineering technology is very important in the production line of the electronic manufacturing industry or the electronic assembling industry. The testing engineering technology is employed to assure that each product or each component of the product has the required quality and reliability. Generally, different products or different components have the corresponding testing processes and testing methods. In addition, a testing program is provided to implement the testing process and the testing method. By executing the testing program, the testing engineer or the testing worker can perform the testing task in the production line.

FIG. 1 is a schematic functional block diagram illustrating a conventional testing system in the production line. The testing system is a computer 1. The computer 1 is electrically connected with an under-test object 3. A testing program 11 is installed in the computer 1. For performing a testing task, the testing program 11 is executed to output a command signal S1 to the under-test object 3. After the command signal S1 is received, the under-test object 3 issues a corresponding response signal S2 to the testing program 11. According to the response signal S2, the testing program 11 acquire the associated information of the under-test object 3 or judges whether the under-test object 3 complies with a quality standard.

Generally, after the testing program 11 outputs a command signal S1 to the under-test object 3, the testing program 11 waits for receiving the response signal S2 from the under-test object 3. If the response signal S2 from the under-test object 3 has not been received by the testing program 11 for a predetermined waiting time period, the testing program 11 performs the testing task again. That is, the testing program 11 issues the command signal S1 to the under-test object 3 again and waits for the receiving the response signal S2 from the under-test object 3. The time period between the time point of generating the command signal S1 from the testing program 11 to the under-test object 3 and the time point of generating a next command signal S1 is referred as a testing cycle. If the number of testing cycles reaches a predetermined number and the response signal S2 from the under-test object 3 has not been received by the testing program 11 for the predetermined waiting time period at this testing cycle, the testing program 11 judges that the under-test object 3 cannot pass the test.

In the conventional testing method of the testing system, the predetermined waiting time period in each testing cycle is identical. That is, after the testing program 11 issues the command signal S1 to the under-test object 3, the time period of waiting for the response signal S2 from the under-test object 3 is constant. If the waiting time period is not long enough, the testing program 11 cannot receive the response signal S2 from the under-test object 3 after the testing program 11 has issued the command signal S1 to the under-test object 3 for the predetermined waiting time period. That is, the insufficient waiting time period may erroneously judge that the under-test object 3 has no feedback or the product is not qualified. If the predetermined waiting time period is insufficient and the predetermined waiting time period is kept unchanged, the testing program 11 cannot receive the response signal S2 from the under-test object 3 in every testing cycle. Under this circumstance, the testing program 11 judges that the under-test object 3 fails to pass the test.

As mentioned above, the conventional testing system and conventional testing method have some drawbacks such as high retest rate, high failure rate and long testing period. Therefore, there is a need of providing an improved technology in order to solve the above drawbacks.

SUMMARY OF THE INVENTION

An object of the present invention provides a method for communicating with an under-test object. There is an exponential relation between the predetermined waiting time period and a number of times the command signal is provided to the under-test object. Consequently, the re-communicating possibility and the failure rate are decreased, and the communicating time period is shortened.

Another object of the present invention provides a communicating system using the above communicating method.

In accordance with an aspect of the present invention, there is provided a communicating method. The communicating method includes the following steps. Firstly, a command signal is provided to an under-test object, and a processing unit waits for receiving a response signal from the under-test object after the command signal is received by the under-test object. If the response signal from the under-test object has not received for a predetermined waiting time period, the command signal is provided to the under-test object again and the predetermined waiting time period is adjusted. Moreover, there is an exponential relation between the predetermined waiting time period and a number of times the command signal is provided to the under-test object.

In accordance with another aspect of the present invention, there is provided a communicating system. The communicating system includes a processing unit. The processing unit provides a command signal to an under-test object and waiting for receiving a response signal from the under-test object after the command signal is received by the processing unit. If the response signal from the under-test object has not received by the processing unit for a predetermined waiting time period, the processing unit provides the command signal to the under-test object again and adjusts the predetermined waiting time period. Moreover, there is an exponential relation between the predetermined waiting time period and a number of times the command signal is provided to the under-test object.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
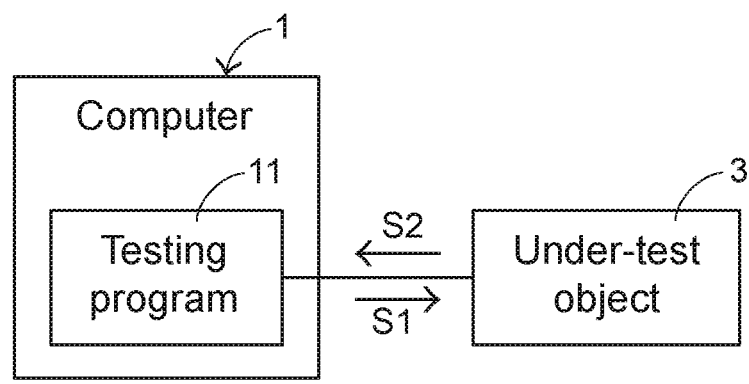
FIG. 1 is a schematic functional block diagram illustrating a conventional testing system in the production line.
Figure 2:
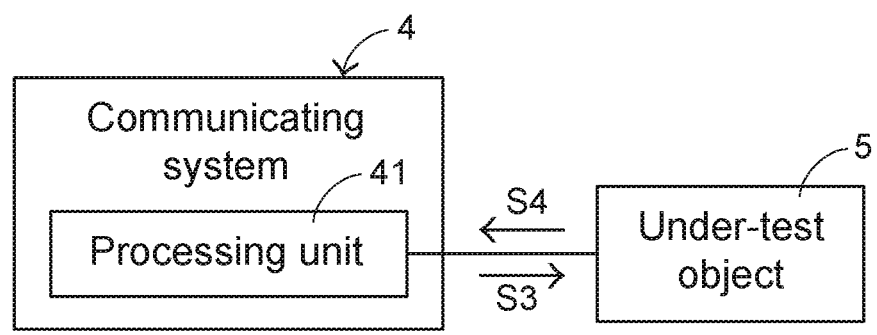
FIG. 2 is a schematic functional block diagram illustrating a communicating system according to an embodiment of the present invention.

FIG. 2 is a schematic functional block diagram illustrating a communicating system according to an embodiment of the present invention. The communicating system 4 is electrically connected with an under-test object 5. The communicating system 4 comprises a processing unit 41. The processing unit 41 has computing capability. The processing unit 41 provides a command signal S3 to the under-test object 5. After the command signal S3 is received by the under-test object 5, the under-test object 5 outputs a response signal S4. In an embodiment, the communicating system 4 is applied to a production line of an electronic manufacturing industry or an electronic assembling industry. According to the response signal S4, the communicating system 4 acquire the associated information of the under-test object 5 or judges whether the under-test object 5 complies with a quality standard. The above application of the communicating system 4 is presented herein for purpose of illustration and description only.

Figure 3:
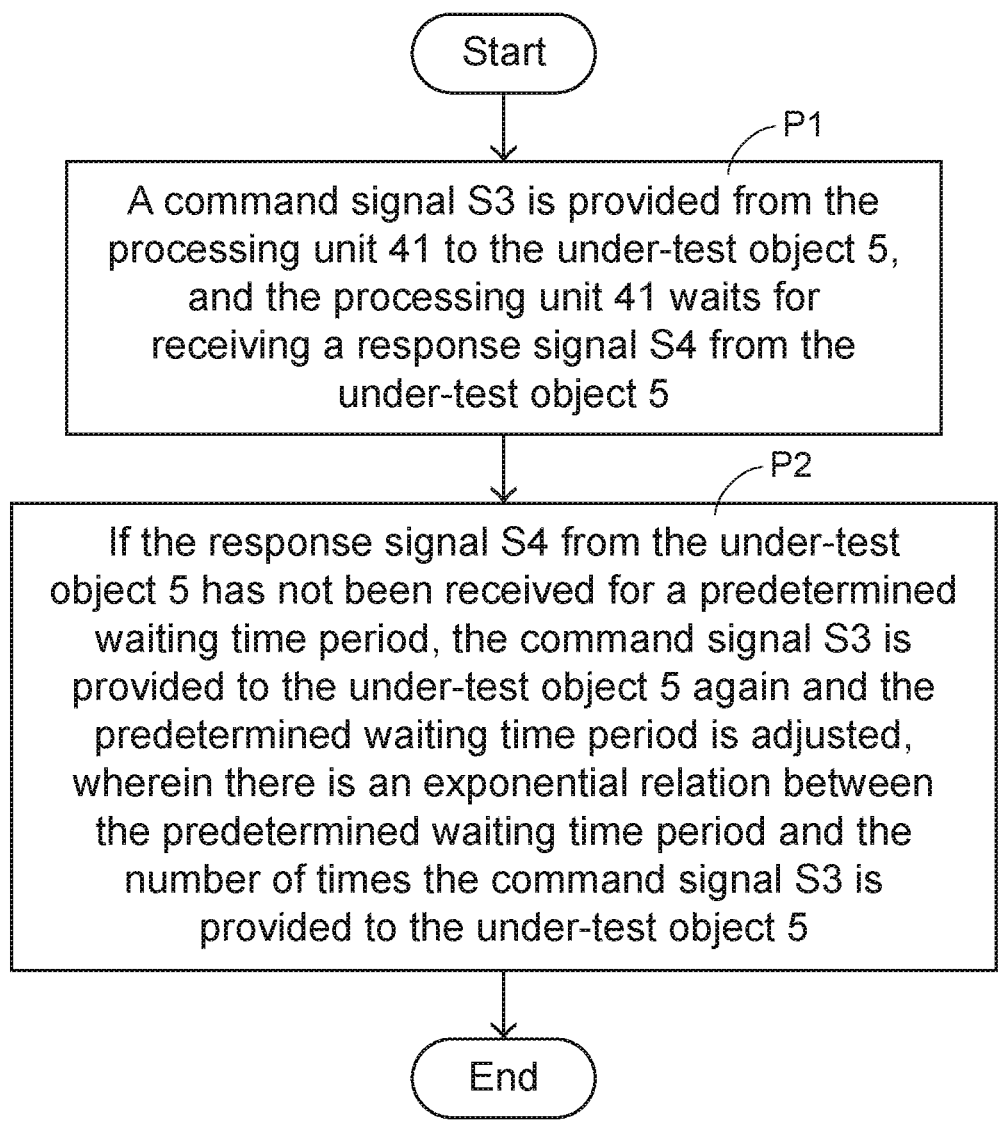
FIG. 3 is a flowchart illustrating a communicating method according to an embodiment of the present invention.

FIG. 3 is a flowchart illustrating a communicating method according to an embodiment of the present invention.

Firstly, in a step P1, a command signal S3 is provided to the under-test object 5 and the processing unit 41 waits for receiving a response signal S4 from the under-test object 5. In a step P2, if the response signal S4 from the under-test object 5 has not been received for a predetermined waiting time period, the command signal S3 is provided to the under-test object 5 again and the predetermined waiting time period is adjusted. In accordance with a feature of the present invention, there is an exponential relation between the predetermined waiting time period and the number of times the command signal S3 is provided to the under-test object 5.

In an embodiment, the exponential relation as described in the step P2 is expressed by the following mathematic formula:

$$T_n = A^{n-1} \times T_1.$$

In the above mathematic formula, A is the base, and n is the number of times the command signal S3 is provided to the under-test object 5, $T_1$ is the predetermined waiting time period after the command signal S3 is provided to the under-test object 5 at the first time, and $T_n$ is the predetermined waiting time period after the command signal S3 is provided to the under-test object 5 at the n-th time. It is noted that the exponential relation of the step P2 is presented herein for purpose of illustration and description only.

When the number of times the command signal S3 is provided from the processing unit 41 to the under-test object 5 reaches a predetermined number and the response signal S4 from the under-test object 5 has not been received by the processing unit 41 for the predetermined waiting time period, the processing unit 41 judges that the communication of the under-test object 5 fails.

Please refer to the communicating method of FIG. 3 and the communicating system of FIG. 2. For testing whether the under-test object 5 complies with the quality standard or acquiring the information of the under-test object 5 (e.g., the firmware version of the under-test object 5, the production date or any other appropriate information), the communicating system 4 starts to communicate with the under-test object 5. After the communicating system 4 communicates with the under-test object 5, the processing unit 41 of the communicating system 4 issues the command signal S3 to the under-test object 5 at the first time and waits for receiving the response signal S4 from the under-test object 5 in response to the command signal S3.

If the response signal S4 from the under-test object 5 is received by the processing unit 41 within the predetermined waiting time period $T_1$, the processing unit 41 judges whether the under-test object 5 complies with the quality standard or acquires the information of the under-test object 5 according to the received response signal S4. If the response signal S4 from the under-test object 5 has not been received by the processing unit 41 for the predetermined waiting time period $T_1$, the above testing procedure is repeatedly done. That is, the processing unit 41 issues the command signal S3 to the under-test object 5 again (i.e., at the second time, n=2) and waits for receiving the response signal S4 from the under-test object 5. In addition, the predetermined waiting time period is adjusted from $T_1$ to $T_2$. In the above mathematic formula, the base A is 2. That is, the predetermined waiting time period $T_2$ is $2^1$ times (two times) of the predetermined waiting time period $T_1$.

If the response signal S4 from the under-test object 5 is received by the processing unit 41 within the predetermined waiting time period $T_2$, the processing unit 41 judges whether the under-test object 5 complies with the quality standard or acquires the information of the under-test object 5 according to the received response signal S4. If the response signal S4 from the under-test object 5 has not been received by the processing unit 41 for the predetermined waiting time period $T_2$, the above testing procedure is repeatedly done. That is, the processing unit 41 issues the command signal S3 to the under-test object 5 again (i.e., at the third time, n=3) and waits for receiving the response signal S4 from the under-test object 5. In addition, the predetermined waiting time period is adjusted from $T_2$ to $T_3$. In the above mathematic formula, the base A is 2. That is, the predetermined waiting time period $T_3$ is $2^2$ times (four times) of the predetermined waiting time period $T_1$, i.e., two times of the predetermined waiting time period $T_2$.

The rest may be deduced by analogy. Then, the processing unit 41 issues the command signal S3 to the under-test object 5 at the (n-1)-th time. If the response signal S4 from the under-test object 5 is received by the processing unit 41 within the predetermined waiting time period $T_{n-1}$, the processing unit 41 judges whether the under-test object 5 complies with the quality standard or acquires the information of the under-test object 5 according to the received response signal S4. If the response signal S4 from the under-test object 5 has not been received by the processing unit 41 for the predetermined waiting time period $T_{n-1}$, the above testing procedure is repeatedly done. That is, the processing unit 41 issues the command signal S3 to the under-test object 5 again (i.e., at the n-th time) and waits for receiving the response signal S4 from the under-test object 5. In addition, the predetermined waiting time period is adjusted from $T_{n-1}$ to $T_n$. In the above mathematic formula, the base A is 2. That is, the predetermined waiting time period $T_n$ is $2^{n-1}$ times of the predetermined waiting time period $T_1$, i.e., two times of the predetermined waiting time period $T_{n-1}$.

From the above descriptions, the present invention provides a communicating method and a communicating system. The predetermined waiting time periods corresponding to different number of times the command signal is provided to the under-test object are different. As the number of times the command signal is provided to the under-test object increases, the predetermined waiting time period increases exponentially. In accordance with the conventional technology, the time period of waiting for receiving the response signal from the under-test object is constant and too short. Consequently, the overall communication process is very long and results in erroneous judgement. Consequently, the re-communicating possibility and the failure rate are decreased, and the communicating time period is shortened. That is, the technology of the present invention is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A communicating method, comprising steps of:
providing a command signal to an under-test object, and waiting for receiving a response signal from the under-test object after the command signal is received by the under-test object; and
if the response signal from the under-test object has not received for a predetermined waiting time period, providing the command signal to the under-test object again and adjusting the predetermined waiting time period, wherein there is an exponential relation between the predetermined waiting time period and a number of times the command signal is provided to the under-test object; wherein the exponential relation is expressed by a mathematic formula:

$$T_n = A^{n-1} \times T_1,$$

wherein A is a base, and n is the number of times the command signal is provided to the under-test object, $T_1$ is the predetermined waiting time period after the command signal is provided to the under-test object at the first time, and $T_n$ is the predetermined waiting time period after the command signal is provided to the under-test object at the n-th time.

2. The communicating method according to claim 1, wherein the base A in the mathematic formula is 2.

3. The communicating method according to claim 1, wherein if the number of times the command signal is provided to the under-test object reaches a predetermined number and the response signal from the under-test object has not been received for the predetermined waiting time period, a communication of the under-test object fails.

4. The communicating method according to claim 1, wherein the communicating method is performed to acquire an information of the under-test object or test whether the under-test object complies with a quality standard.

* * * * *